United States Patent [19]

Jaskie

[11] Patent Number: 5,115,344
[45] Date of Patent: May 19, 1992

[54] TUNABLE DIFFRACTION GRATING

[75] Inventor: James E. Jaskie, Scottsdale, Ariz.

[73] Assignee: Motorola, Inc., Schaumburg, Ill.

[21] Appl. No.: 592,389

[22] Filed: Oct. 3, 1990

[51] Int. Cl.$^5$ .............................................. G02B 5/18
[52] U.S. Cl. ................................... 359/573; 359/566; 359/569
[58] Field of Search .................... 350/162.11, 162.17, 350/162.2, 162.24

[56] References Cited

U.S. PATENT DOCUMENTS

| | | | |
|---|---|---|---|
| 3,402,001 | 9/1968 | Fleisher | 350/162.24 |
| 3,813,142 | 5/1974 | Buhrer | 350/162.24 |
| 3,923,380 | 12/1975 | Hattori et al. | 350/162.24 |
| 4,115,747 | 9/1978 | Sato et al. | 350/162.24 |
| 4,243,300 | 1/1981 | Richards et al. | 350/162.11 |

Primary Examiner—Bruce Y. Arnold
Assistant Examiner—J. P. Ryan
Attorney, Agent, or Firm—Miriam Jackson

[57] ABSTRACT

A diffraction grating can be tuned by varying the spacing of the rows of the diffraction grating. The diffraction grating is comprised of rows of an electrically conductive material disposed on a deformable material. The deformable material is transparent to a light of numerous wavelengths. A means for applying a voltage on the rows of the electrically conductive material is provided to change the spacing of the rows, thus changing which wavelength of light is diffracted.

18 Claims, 2 Drawing Sheets

TUNABLE DIFFRACTION GRATING

BACKGROUND OF THE INVENTION

This invention relates, in general, to a diffraction grating, and more particularly, to a tunable diffraction grating.

Information may be transmitted through optical wavelengths in the visible and near visible region. The amount of information which may be transmitted through optical wavelengths may be increased by multiplexing several beams of light, each of a different wavelength and modulated such that it alone is transmitting a large amount of information.

These wavelengths of light, or signal, is usually transmitted through an optical fiber. Each individual wavelength of light then must be separated in order to receive and process the information transmitted on it. A diffraction grating is suitable for this purpose. Semiconductor devices, such as photodetectors, are used to further process the wavelength of light.

A diffraction grating of the prior art consists of a glass, quartz, or plastic material having peaks and valleys or rows having a fixed spacing. The material is transparent at the wavelength of interest. An optical fiber is positioned such that the light traverses the diffraction grating. The spacing between the rows or the valleys between the peaks are positioned such that the wavelength of interest is diffracted along the grating. This means that the spacing or width of the valleys must be fixed along a predetermined section of the grating. The spacing or width of the valleys can be different in different sections of the diffraction grating such that different wavelengths of light diffract at different sections along the grating. Each of the wavelengths may then be further processed at particular locations along the diffraction grating.

If these diffraction gratings are integrated along with semiconductor integrated circuits, it would be desirable for the diffraction grating to be easily integratable and for it to be as small as possible. In order to monitor a large amount of information, either multiple diffraction gratings having fixed spacing or a large grating having variable spacing is necessary. It is also necessary to have multiple photodetectors, one for each grating or one for each wavelength of light to be monitored along a grating having variable spacing. It would be desirable to be able to monitor large amounts of information on one small diffraction grating.

Another method of separating wavelengths of light is with the use of Fabri-Perrot interferometers with piezoelectric drives. The disadvantage of these structures is that they are complicated, delicate, and expensive, and thus will not be further described. It would be desirable to provide a diffraction grating that can monitor various wavelengths of light which is inexpensive and not complicated.

Accordingly, it is an object of the present invention to provide a diffraction grating which can monitor large amounts of information by being able to tune the diffraction grating to diffract different wavelengths of light.

Another object of the present invention is to provide a tunable diffraction grating which may be easily integrated onto a semiconductor device.

A further object of the present invention is to provide a tunable diffraction grating which is inexpensive to fabricate.

Yet another object of the present invention is to provide a way to change the spacing of the rows of a diffraction grating.

SUMMARY OF THE INVENTION

The above and other objects and advantages of the present invention are achieved by a diffraction grating wherein the spacing between the rows of the diffraction grating may be changed. The diffraction grating is comprised of rows of an electrically conductive material disposed on a deformable material. The deformable material is transparent to a light of numerous wavelengths. A means for applying a voltage on the rows of the electrically conductive material is provided to make the diffraction grating tunable to different wavelengths of light. The applied voltage causes each row to be repelled or attracted, thus increasing or decreasing the spacing of the rows and allowing different wavelengths of light to be diffracted. By varying the applied voltage, the spacing may be varied accordingly so that the diffraction grating may be tuned to desired wavelengths of light.

DETAILED DESCRIPTION OF THE DRAWINGS

Figure 1:
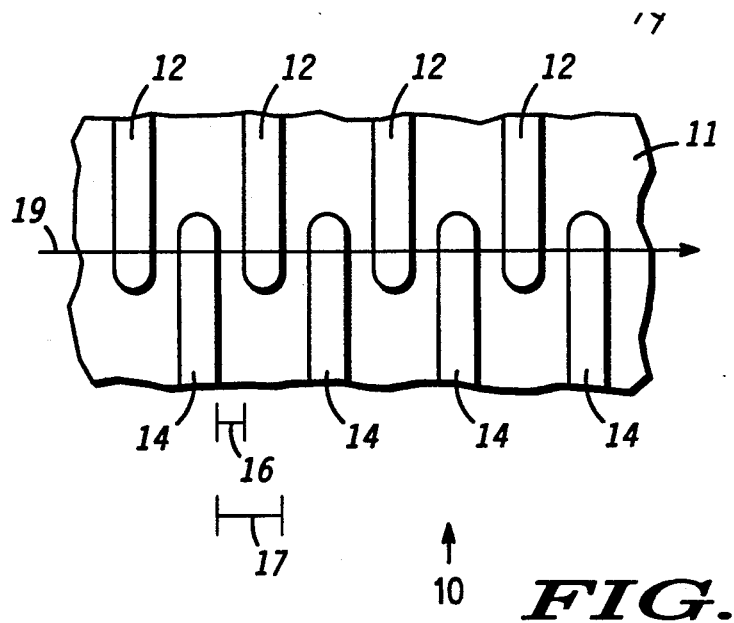
FIG. 1 illustrates an enlarged, top view of a portion of a diffraction grating of the present invention.

FIG. 1 illustrates an enlarged, top view of a portion of a diffraction grating 10 of the present invention. What is shown is alternate rows 12 and 14 of an electrically conductive material disposed on a deformable material 11. Rows 12 are spaced apart from rows 14 by a spacing 16. The distance between a row 14 starting from a point closest to a row 12 to the outside edge of that row 12 is shown here as spacing 17. The wavelength of a light 19 which will be selected by a particular diffraction grating 10, for a given angle of incidence and diffraction, is a function of spacing 17. Spacing 16 is shown for convenience in describing tunable diffraction grating 10 of the present invention. Note also that the wavelength of light 19 which will be selected is also a function of spacing 16 because spacing 16 is a function of spacing 17. To select one wavelength of light 19, spacing 16 must be substantially the same between rows 12 and 14 in a given portion of grating 10 along a path in which incident light 19 traverses. The length of the portion in which spacing 16 must be substantially the same is dependent upon the percentage of the wavelength of light 19 which is to be selected which is necessary to transmit information. Note that grating 10 may be divided into several portions (not shown) having spacing 16 of a different width, but the same in each specific portion.

Any electrically conductive material may be used to form rows 12 and 14. Examples of such materials include gold or polyacetylene. Deformable material 11 must be optically transparent to the wavelengths of light 19 which are to be selected. Any deformable materials, such as polymers or elastomers having an index of refraction $n_1$, may be used.

Diffraction grating 10 can be tuned by applying a positive voltage on rows 12 and 14, by applying a negative voltage on rows 12 and 14, or by applying a negative voltage on rows 12 and a positive voltage on rows 14 (or vice versa) by any suitable means. When the voltage is applied to rows 12 and 14, the electrostatic forces between rows 12 and 14 cause each alternate row 12 and 14 to repel or attract each other thus increasing or decreasing spacing 16.

Figure 2:
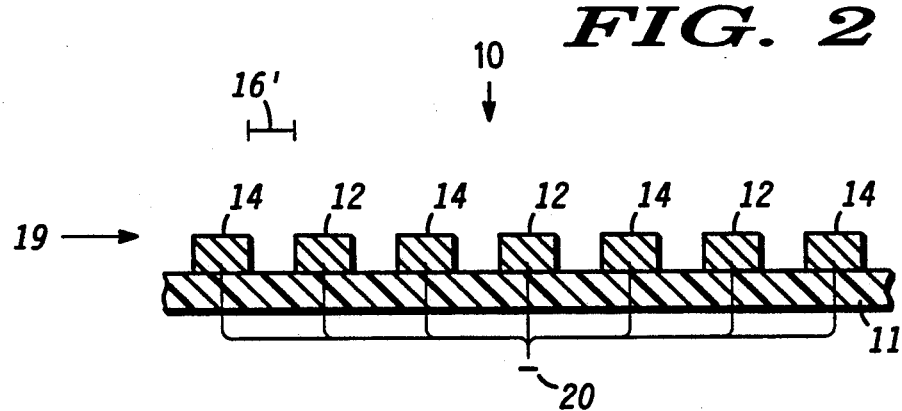
FIG. 2 illustrates an enlarged, cross-sectional view of a first embodiment of the present invention.

FIG. 2 illustrates a cross-sectional view of a portion of diffraction grating 10 as shown in FIG. 1, but having a new spacing 16'. FIG. 2 illustrates the case where a negative voltage 20 is applied to rows 12 and rows 14. When negative voltage 20 is applied to rows 12 and 14, the electrostatic forces between rows 12 and 14 cause each alternate row 12 and 14 to repel each other thus increasing spacing 16 to a new spacing 16'. New spacing 16' diffracts a different wavelength of light than spacing 16. Varying the voltage on rows 12 and 14 changes spacing 16, so that by proper design of rows 12 and 14 and spacing 16, diffraction grating 10 may be used to tune across a band of wavelengths of light 19 for the desired wavelength. Upon varying the voltage on rows 12 and 14, rows 12 and 14 are able to move because they are positioned on deformable material 11. Diffraction grating 10 may also be used to minimize noise by tuning by selecting only the desired wavelengths of light.

Rows 12 and 14 of diffraction grating 10 may be fabricated on deformable material 11 by any suitable methods known in the art. For example, rows 12 and 14 may be fabricated by casting them on deformable material 11. Rows 12 and 14 may also be formed by sputtering or evaporating an electrically conductive material on deformable material 11 and then removing portions of the electrically conductive material to form rows 12 and 14. Removal of portions of the electrically conductive material may be accomplished by, for example, etching or ion milling.

Figure 3:
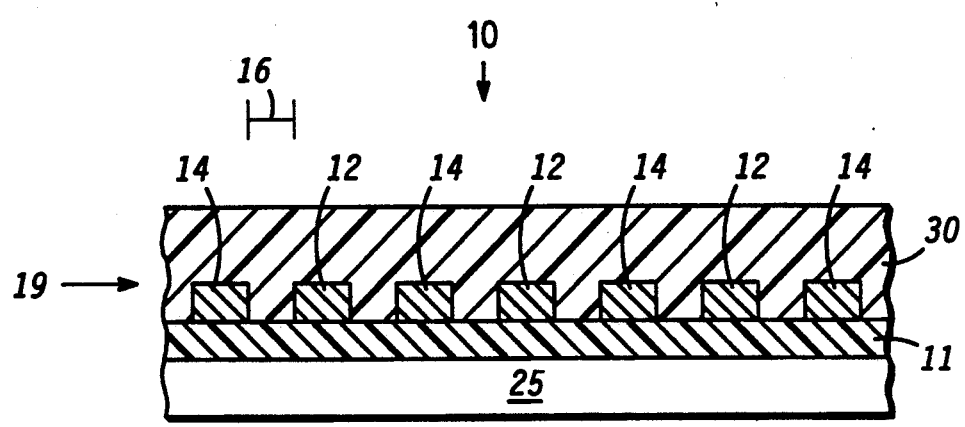
FIG. 3 illustrates an enlarged, cross-sectional view of a second embodiment of the present invention.

FIG. 3 illustrates a cross-sectional view of a second embodiment of a diffraction grating 10 of the present invention. The same reference numerals are used for the same elements shown in FIG. 1 throughout all the FIGS. In this embodiment, a second deformable material 30 is formed over rows 12 and 14. Deformable material 30 may be the same as deformable material 11, having the same index of refraction $n_1$. However, it may be desirable for deformable material 30 to have a second index of refraction $n_2$. In this case, deformable material 11 would work to further bend a particular wavelength of light 19 into, for example, a photodetector 25. Diffraction grating 10 is positioned on photodetector 25 by any suitable means. In fact, diffraction grating 10 may be separated from photodetector 25 by a pocket of air (not shown). Preferably, diffraction grating 10 is integrated with photodetector 25 or other devices that are capable of manipulating light.

Figure 4:
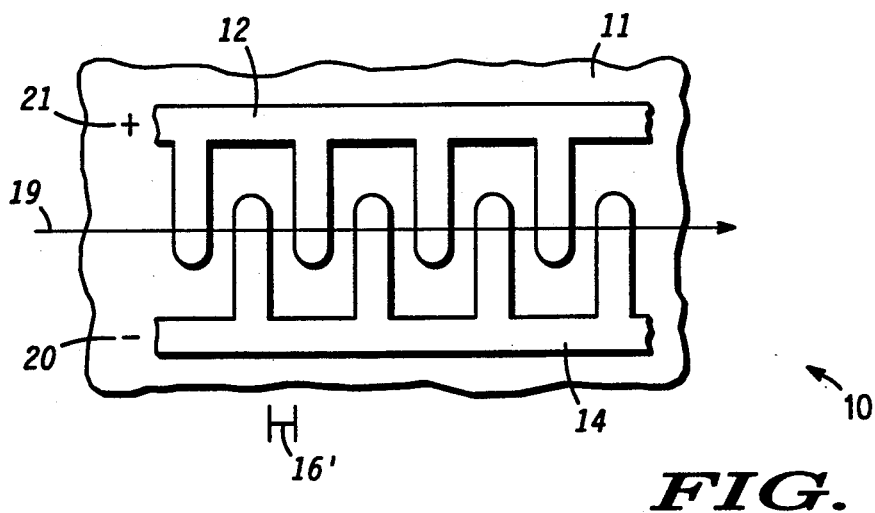
FIG. 4 illustrates a top view of a portion of a diffraction grating of the present invention, shown in a first configuration.

FIG. 4 illustrates a top view of a diffraction grating 10 formed in a first configuration. As described with reference to FIG. 1, spacing 16 must be substantially the same in a given portion of diffraction grating 10 along a path through which incident light 19 traverses. Thus, spacing 16 outside the path in which incident light 19 traverses may vary in a given portion of diffraction grating 10. This means that an infinite number of configurations are possible as long as spacing 16 is the same in a given portion of diffraction grating 10 along the path in which incident light 19 traverses. FIG. 4 illustrates one such configuration. Note that rows 12 are conveniently connected so that a means for applying a positive voltage 21 is also convenient. Rows 14 are formed in similar fashion, but have negative voltage 20 applied thereto. In this embodiment, when positive voltage 21 and negative voltage 20 is applied, rows 12 and 14 would attract each other, thus providing decreased spacing 16'.

Figure 5:
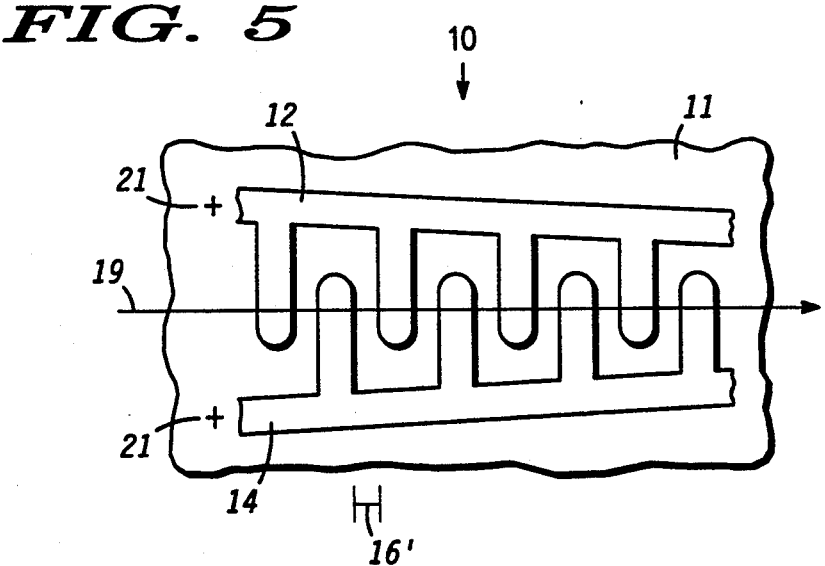
FIG. 5 illustrates a top view of a diffraction grating of the present invention, shown in a second configuration.

FIG. 5 illustrates a second configuration of a diffraction grating 10. In this embodiment, when positive voltage 21 is applied, rows 12 and 14 would repel each other, thus providing increased spacing 16'. Rows 12 and 14 of diffraction grating 10 must be designed to take into account the stresses, resistances, and capacitances present in diffraction grating 10. These parameters depend on the materials which comprise rows 12 and 14 and deformable layer 11. What is desired is that rows 12 and 14 be designed such that when positive voltage 21 is applied, new spacing 16' is still the same between rows 12 and 14 for a given section of diffraction grating 10. FIG. 5 illustrates a diffraction grating 10 having rows 12 and 14 having a diminishing length along a portion of diffraction grating 10. This configuration may be preferable where there is low resistance and capacitance present.

Figure 6:
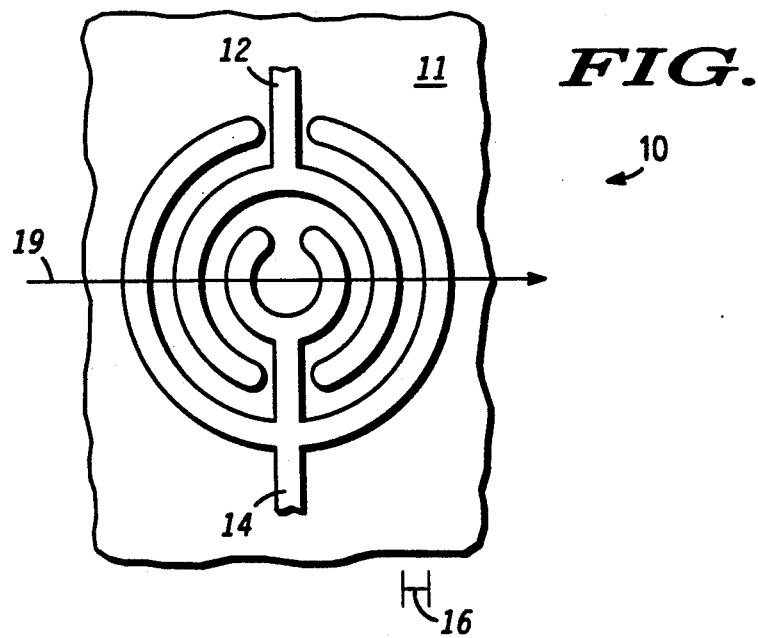
FIG. 6 illustrates a top view of a diffraction grating of the present invention, shown in a third configuration.

FIG. 6 illustrates a third configuration of diffraction grating 10. In addition, note that spacing 16 along the path in which incident light 19 traverses diffraction grating 10 can be designed to be substantially the same. Many other configurations, obviously which all can not be shown, are possible.

As can be readily seen, a tunable diffraction grating has been provided by the present invention. The tunable diffraction grating of the present invention allows selection of different wavelengths of light by varying the voltage across alternate rows of a diffraction grating. In this manner, large amounts of information may be transmitted and received in a small, integratable tunable diffraction grating.

I claim:

1. A tunable diffraction grating, comprising:
    rows of an electrically conductive material disposed on a deformable material, wherein the deformable material is transparent to a light of numerous wavelengths, and wherein the rows of the electrically conductive material diffract a first wavelength of light; and
    a means for applying a voltage on the rows of the electrically conductive material to cause a change in space between the rows so that the diffraction grating diffracts a second wavelength of light.

2. The tunable diffraction grating of claim 1 wherein the electrically conductive material is a reflective or transmissive material.

3. The tunable diffraction grating of claim 1 wherein the electrically conductive material is comprised of gold.

4. The tunable diffraction grating of claim 1 wherein the means for applying a voltage comprises a means for applying a positive and a negative voltage on alternate rows of the electrically conductive material.

5. The tunable diffraction grating of claim 1 wherein the means for applying a voltage comprises a means for applying a positive voltage on the rows of the electrically conductive material.

6. The tunable diffraction grating of claim 1 wherein the means for applying a voltage comprises a means for applying a negative voltage on the rows of the electrically conductive material.

7. The tunable diffraction grating of claim 1 wherein the deformable material is comprised of a polymer or an elastomer.

8. A tunable diffraction grating, comprising:
rows of an electrically conductive material disposed on a deformable material, wherein the deformable material is a polymer, and is transparent to a light of numerous wavelengths, and wherein the rows of the electrically conductive material diffract a first wavelength of light;
a means for applying a voltage on the rows of the electrically conductive material to cause a change in space between the rows so that the diffraction grating diffracts a second wavelength of light, and
a photodetector adjacent to the tunable diffraction grating.

9. A tunable diffraction grating, comprising:
rows of an electrically conductive material disposed in a deformable material, wherein the deformable material is a polymer, and is transparent to a light of numerous wavelengths, and wherein the rows of the electrically conductive material diffract a first wavelength of light; and
a means for applying a voltage on the rows of the electrically conductive material such that the diffraction grating diffracts a second wavelength of light.

10. The tunable diffraction grating of claim 9 wherein the deformable material is comprised of a polymer or an elastomer.

11. A tunable diffraction grating, comprising: rows of an electrically conductive material disposed on a first deformable material, wherein the first deformable material is transparent to a light of numerous wavelengths and has a first index of refraction, and wherein the rows of the electrically conductive material diffract a first wavelength of light;
a second deformable material disposed on the rows of the electrically conductive material, wherein the second deformable material is transparent to a light of numerous wavelengths and has a second index of refraction; and
a means for applying a voltage on the rows of the electrically conductive material such that the diffraction grating diffracts a second wavelength of light.

12. The tunable diffraction grating of claim 11 wherein the first index of refraction is equal to the second index of refraction.

13. The tunable diffraction grating of claim 11 further comprising a photodetector adjacent to the tunable diffraction grating.

14. The tunable diffraction grating of claim 11 wherein the deformable material is comprised of a polymer or an elastomer.

15. A tunable diffraction grating, comprising:
rows of an electrically conductive material substantially equally spaced by a first spacing which diffracts a first wavelength of light disposed on a deformable material, wherein the deformable material is transparent to a light of numerous wavelengths; and
a means for applying a voltage on the rows of the electrically conductive material to change the first spacing to a second spacing which diffracts a second wavelength of light.

16. A tunable diffraction grating, comprising:
sections of rows of an electrically conductive material substantially equally spaced by at least a first spacing which diffracts a first wavelength of light and a second spacing which diffracts a second wavelength of light disposed on a deformable material, wherein the deformable material is transparent to a light of numerous wavelengths; and
a means for applying a voltage on the rows of the electrically conductive material to change the first spacing to a third spacing which diffracts a third wavelength of light and to change the second spacing to a fourth spacing which diffracts a fourth wavelength of light.

17. The tunable diffraction grating of claim 16 further comprising a photodetector adjacent to the tunable diffraction grating.

18. The tunable diffraction grating of claim 16 wherein the deformable material is comprised of a polymer or an elastomer.

* * * * *